A. B. Thompson.
Broom and Brush Holder.

No. 101,062.          Patented Mar. 22, 1870.

Witnesses,
Wm. K. Porter
H. P. Cleveland

Inventor.
A. B. Thompson

United States Patent Office.

A. B. THOMPSON, OF OWEGO, NEW YORK, ASSIGNOR TO HIMSELF AND ALBERT CLEVELAND, OF SAME PLACE.

Letters Patent No. 101,062, dated March 22, 1870; antedated March 7, 1870.

IMPROVED CLAMP FOR HOLDING BROOMS, BRUSHES, &c.

The Schedule referred to in these Letters Patent and making part of the same.

*To all whom it may concern:*

Be it known that I, A. B. THOMPSON, of Owego, Tioga county, and State of New York, have invented a new and useful Self-Adjusting Clamp for Holding Brooms, Whips, Brushes, and similar articles; and I do hereby declare the following to be a full, clear, and exact description of the same, reference being had to the accompanying drawings and to the letters of reference marked thereon.

In the accompanying drawings—

The nature of my invention consists in making a self-adjusting clamp composed of a metal plate, the back of which is to be screwed fast to a wall or pilaster, and on the front of this plate, at each side, a ledge projects to the front, which are inclined, the bottom ends of the ledges being nearest each other.

Inside the ledges are two circular jaws, which roll up and down the inclined ledges, approaching each other as they descend, in such a way as to grasp and hold articles placed between them.

The jaws are kept from turning over or getting displaced by means of teeth on their outer edges meshing in teeth cast on the inclined ledges.

To enable others skilled in the art to make and use my invention, I will describe its construction and operation.

The plate A has a hole in its center, through which a screw passes to fasten it to a wall, and also a small pin or point to penetrate the wall to prevent the clamp from turning or swinging upon the screw.

Figure 1:
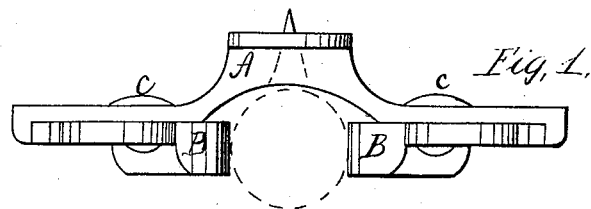
Figure 1 is a view of the top of the clamp.

The front side of the plate is concave in its center, fig. 1, to allow round handles to pass back between the jaws.

Figure 2:
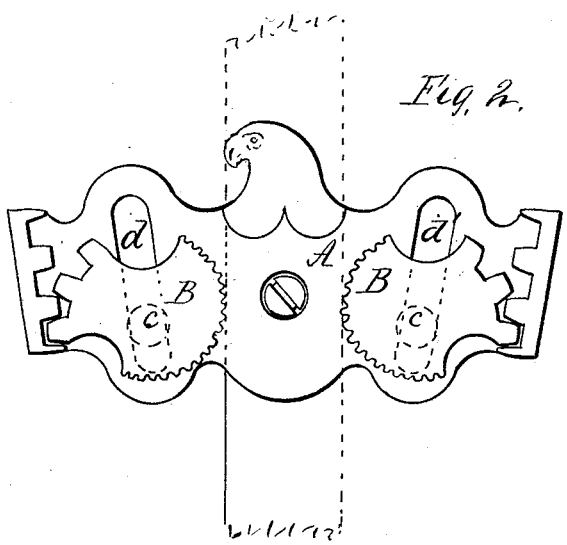
Figure 2 is a front elevation, and shows clearly the arrangement of parts.

Each side of the plate A has a ledge projecting in front, on which teeth or cogs are cast which point inward toward each other, (see fig. 2,) each row of teeth extending from top to bottom of the plate on each side, right and left.

Directly on the front of the plate and each side of the center are two movable jaws B B.

The outer edges of the jaws have teeth, which engage in the teeth on the inclined ledges on plate A, which prevent the jaws from turning round so as to get displaced.

Each jaw is provided with a short stud, c, which is fast in it, and extends back through a slot in the plate A and terminates in a flat head, which prevents the jaw from coming off.

Each slot is inclined at the same angle as the teeth on that side of the plate A, so that the studs move freely as the jaws roll up and down the inclines, and the teeth engage uniformly at both top and bottom.

In placing a handle in the clamp, it is done with an upward movement, and the jaws roll up until the handle goes between them, when they fall against it by their own weight, and are drawn tight upon the handle by its weight being suspended between them.

Articles are taken from the clamp by an upward movement, in the same manner as they are placed in it.

I do not claim a clamp with jaws swinging on pivots; but

What I do claim, and desire to secure by Letters Patent, is—

A self-adjusting clamp, constructed of a plate, A, and jaws B B, which roll up and down inclines d d', to open and close in the manner and for the purpose herein specified.

A. B. THOMPSON.

Witnesses:
  GILBERT NEWELL,
  M. C. WELLS.